United States Patent [19]
Kano et al.

[11] Patent Number: 5,168,399
[45] Date of Patent: Dec. 1, 1992

[54] TAPE LOADING MECHANISM FOR A ROTATING DRUM AND CASSETTE TAPE RECORDING AND REPRODUCING APPARATUS

[75] Inventors: Kiyoshi Kano, Yokohama; Tatsuya Shigemura; Yoshiyuki Tanaka, both of Katsuta; Yoshihiro Fukagawa, Yokohama, all of Japan

[73] Assignees: Hitachi, Ltd., Tokyo; Hitachi Video Engineering Inc., Kanagawa, both of Japan

[21] Appl. No.: 349,497

[22] Filed: May 9, 1989

[30] Foreign Application Priority Data

| May 13, 1988 | [JP] | Japan | 63-114661 |
| May 13, 1988 | [JP] | Japan | 63-114662 |
| May 13, 1988 | [JP] | Japan | 63-114663 |
| May 13, 1988 | [JP] | Japan | 63-114664 |

[51] Int. Cl.[5] .................... G11B 5/027; G11B 15/60
[52] U.S. Cl. ............................ 360/85; 360/130.22; 360/130.23; 360/95
[58] Field of Search ............ 360/84, 85, 95, 130.22, 360/130.23, 83

[56] References Cited

U.S. PATENT DOCUMENTS

| 4,556,922 | 12/1985 | Erhart | 360/85 |
| 4,620,245 | 10/1986 | Shimizu | 360/85 |
| 4,739,421 | 4/1988 | Narasawa | 360/85 |
| 4,788,609 | 11/1988 | Yamada et al. | 360/85 |
| 4,862,300 | 8/1989 | Kaku et al. | 360/85 |
| 4,928,191 | 5/1990 | Kaku et al. | 360/85 |

*Primary Examiner*—Andrew L. Sniezek
*Attorney, Agent, or Firm*—Antonelli, Terry, Stout & Kraus

[57] ABSTRACT

A tape loading mechanism used in a recording and reproducing apparatus for extracting a tape from a cassette and for winding it on a tape guide drum on which a rotating head for recording information on or reproducing information from the tape is mounted. A guide base, on which a group of guides for extracting the tape from the cassette are mounted, is rotatably supported by a shaft on a drive member that drives the guide base. An attitude control member is installed along the path of travel of the guide base to engage with the sides of the guide base to control the rotating angle of the latter.

2 Claims, 16 Drawing Sheets

TAPE LOADING MECHANISM FOR A ROTATING DRUM AND CASSETTE TAPE RECORDING AND REPRODUCING APPARATUS

BACKGROUND OF THE INVENTION

This invention relates to an apparatus such as a video tape recorder (VTR) in which a tape is wound on a tape guide drum through a specified angle (loading operation) to record information on or reproduce information from the tape, and more particularly, to a tape loading mechanism suitable for reducing the cost of the recording and reproducing apparatus.

The conventional tape loading mechanism such as used in a VTR, which is one of the applications of this invention, has the following drawbacks.

(1) The operation of the tape loading mechanism is complex and varied, requiring a large number of component parts.

(2) To improve image quality, high precision is required for manufacture, assembly and coordination of the parts.

(3) High reliability is required for maintaining the recorded information.

These inevitably have contributed to increasing the cost.

To overcome these problems, improvements on the VTR tape loading mechanisms have been proposed in (1) the Japanese Patent Application Laid-Open No. 62-232750, (2) the Japanese Patent Application Laid-Open No. 58-218066, and (3) the Japanese Patent Application Laid-Open No. 57-133558. The tape loading mechanisms proposed in these patent applications realized a certain measure of simplification in the mechanism and reduction in cost. The inventors of this invention already proposed, with other joint inventors, a novel tape loading mechanism which is described in U.S. patent application Ser. No. 259,324, now U.S. Pat. No. 4,985,788, and corresponding Korean Patent Application No. 1988-13516. When one considers making a further reduction in cost, the following problems must be tackled.

(1) In the tape loading mechanism proposed in the Japanese Patent Application Laid-Open No. 62-232750, the guide base, on which tape guiding members for winding the tape on the tape guide drum are mounted, is engaged with a so-called guide plate which controls the path of travel and the attitude of the guide base. This makes it necessary during the assembly of the mechanism that the guide base and the guide plate be assembled to engage each other before the assembly is installed into the mechanism. Thus, the assembly efficiency becomes inevitably poor, thereby increasing the cost.

(2) Another disadvantage of the mechanism of the Japanese Patent Application Laid-Open No. 62-232750 is a construction in which the full-width erase head for erasing unnecessary recorded information from the tape is moved during the tape loading operation. This process is taken to avoid mechanical interference between the incoming side guide base and the full-width erase head when the guide base is moved, and to wind the tape on the full-width erase head over a sufficient winding angle at the completion of loading operation. The use of this head moving type construction increases the number of parts and also demands high precision on those parts that support the head for accurate positioning of the full-width erase head after the tape loading is completed. These inevitably increase the cost of the mechanism.

(3) In the mechanism described in the Japanese Patent Application Laid-Open No. 58-218066, three members—one of paired tape guides (first and second guides), one of two moving rings (first and second rings) that drive the guides, and drive rings that drive the first and second rings—are stacked one upon the other so that they are rotatable concentrically. Similar to this construction, a mechanism which uses arc sliders in place of the rings is known. In such loading mechanisms, the rotating rings or arc drive members are held and positioned in the following manner. The position of these members in the radial direction is restricted by gears or rollers that receive their outer circumference by engaging with a gear formed on the outer circumference of these members. The vertical position is restricted by flanges formed integrally with the gears or rollers that clamp the rings or arc drive members.

The above conventional technique does not take into consideration the warping or deflection of the arc drive members by their own weight when holding them in position. When, for example, the arc drive member with a gear formed on its outer circumference is to be held in position, it must be basically supported at all times by three members, that is, a first gear that drives the arc drive member, a second gear that supports the outer circumference of the arc drive member, and a roller that supports the inner circumference of the arc drive member and is arranged at an intermediate position between the two gears. When, however, the arc drive member is rotated through a wide rotating angle and the drive or support gear engages with the starting or terminating end of the gear of the arc drive member, the other end of the arc drive member parts from the three supporting points, with the result that the arc drive member will warp or deflect at its ends due to its own weight, impact, gear backlash or play. This in turn will easily result in an interference or collision between the arc drive members or between the arc drive members and other members, causing operation failures.

The arc drive members must transmit a pressing force to the pair of tape guides to force them to specified positions. When, however, the direction in which the tape guide is pushed differs from a direction in which the arc drive member is rotated, for example, when the arc drive member is rotated parallelly to the cassette mounting plane and the tape guide is pushed in a direction inclined with respect to that plane, the arc drive member will receive a reaction acting in a direction opposite to that in which the tape guide is pressed, causing the arc drive member to deflect, leading to operation failures.

To forestall such operation failures requires many auxiliary parts, pushing up the cost of the mechanism.

(4) In the mechanism introduced in the Japanese Patent Application Laid-Open No. 57-133558, the tape guide is guided along a predetermined path by a T-shaped rail (guide member) and by a tape guide with a C-shaped clamping portion that engages with the rail. In an apparatus where the tape guiding members are arranged three-dimensionally, the tape guide must be moved along a complex route made up of a straight, curved, and inclined paths to avoid interference by the tape guiding members mounted on the chassis (such as a stationary head, vertical position restricting guide, rotating drum, etc.). Further, if an attempt is made to reduce the size of the travel route for the tape guide to make the mechanism compact and lightweight, the rail may be formed of plastic in small size. In that case, however, the rail has a limited rigidity and when the tape guide is stressed with an overload, the rail would be deformed with the result that the tape guide would contact the tape guiding members such as a rotating drum during the loading operation, causing the mechanism to stop or damaging the travel guide.

The rail and the tape guide are engaged with each other with a very small clearance. At the loading completion position, however, the tape guide has an increased clearance from the rail because the tape guide must be free from the restriction by the rail to be positioned by the catcher. Because of this greater clearance, the tape guide is pulled by the back tension of the tape immediately before the completion of the loading process and is thus greatly tilted contacting the rotating drum, causing damages to the rotating drum and head or even failing to enter into the catcher. Another drawback is that when the cassette is being loaded, the tape guide would incline outwardly from the cassette depending on the attitude of the apparatus and the clearance, so that the tape would fail to be loaded at a specified position. As a result, the misaligned tape is extracted stopping the operation of the mechanism.

On the other hand, when the clearance is made small, the rail made up of a plurality of different arcs cannot provide a uniform clearance for both small arcs and large arcs, causing the tape guide to stick.

To forestall these operation failures, a large number of auxiliary parts are needed, increasing the cost of the mechanism. These are the disadvantages of the conventional mechanisms.

SUMMARY OF THE INVENTION

An object of this invention is to provide a tape loading mechanism which costs less than the conventional ones and overcomes the aforementioned problems (1) to (4).

To achieve the above objective, this invention provides the following novel constructions (1) to (4).

(1) The guide base is rotatably supported by a shaft on the drive member, and an attitude control member is provided at the side of the guide base on the same plane as the guide base to restrict the attitude of the guide base over the travel range of the latter by directly engaging with the guide base.

(2) The full-width erase head is made stationary and, at the loading completion position, the guide base is made to engage with a part of a positioning member which is arranged to make an acute angle with the direction of drive force of the drive member.

(3) As a means for supporting the arc drive members, a guide member is provided at a position where the ends of a first and a second arc drive member adapted to be rotated in opposite directions cross each other. One of the arc drive members (the second arc drive member), which is disposed on the base side (or lower side) with respect to the vertical direction, has its end deviated from the diameter of the other arc drive member (the first arc drive member). The guide member engages with the end of the second arc drive member to restrict the height of the upper side of the second arc drive member while at the same time engaging with the underside of the first arc drive member. Also, the guide member restricts the vertical position of the second arc drive member that receives a reactive force from the tape guide.

(4) The clearance between the tape guide and the rail is made slightly larger for the area immediately before and at the loading completion position. The rail is provided integrally with a wall to prevent the tape guide from inclining toward the rotating drum.

Of the above constructions, item (1) produces the following results.

The attitude control member engages, from the side, the outer periphery of the guide base placed in the same plane as the attitude control member, to restrict the rotating attitude of the guide base about the fixed shaft and also the position of the latter. With the rotating attitude and the position of the guide base determined, the attitude and position of the inclined pin and guide roller fixedly mounted on the guide base are also determined, thus ensuring the desired tape loading operation to be performed.

This makes it possible to eliminate the guide plate and assemble components by simply stacking them one after another, enhancing the efficiency of assembly work. This in turn produces an advantage of reduced cost.

The item (2) produces the following results.

One end of the guide base on the drive member is pressed against an inclined surface of the stationary positioning member by the driving force of the drive member. The reactionary force the guide base receives from the positioning member causes the tape guide on the guide base to be pressed against the V-shaped groove of the catcher and positioned there. This allows the guide base to have a large rotating angle in the small mechanism. This construction also provides a sufficient tape winding angle for the erase head when the tape guide is received in the V-shaped groove of the catcher during the loading operation.

The above construction permits a reduction in size of the loading mechanism in which the full-width erase head is held stationary. Furthermore, the number of parts and processes can also be reduced, which in turn improves the assembly work efficiency and mitigates the precision requirements of the parts. These factors combine to reduce the manufacture cost of the mechanism.

The item (3) of the novel constructions produces the following results.

The second arc drive member which has its end deviated from the diameter of the first arc drive member is as it is rotated, restricted in its vertical position by the guide member, so that the second arc drive member is guided under the guide member immediately before it crosses the first arc drive member. Since the first arc drive member is rotated on the guide member, there is no chance of the end of the first arc drive member interfering with the end of the second arc drive member. The guide member restricts the upper surface position of the second arc drive member, so that the guide member can receive the reactive force from the tape guide.

With this construction, it is possible to avoid interference between the first and second arc drive members or between the arc drive members and other components by the single guide member without having to use a large number of guiding parts. The guide member also serves as a means to receive a reactive force from the tape guide, contributing to a reduction in cost. At the same time, since the vertical gap between the arc drive members is narrowed, the apparatus has a reduced thickness as a whole.

The item (4) of the novel constructions produces the following results.

At a position immediately before the tape loading completion, the clearance between the tape guide and the rail is set slightly larger than at other positions. To prevent the tape guide from inclining toward the tape guide drum, a wall is provided. This prevents the tape guide from contacting the tape guide drum.

During the cassette loading, the clearance between the tape guide and the rail is equal to the clearance that exists during the tape loading. To, prevent the tape guide from inclining away from the cassette, a wall is provided. This prevents the tape guide from inclining away from the cassette when the apparatus is tilted. Thus, the tape guide can reliably be installed into the cassette regardless of the attitude of the apparatus.

These two walls are formed integrally with the rail, so that there is no need to use many auxiliary members, reducing the cost of the mechanism. Moreover, since the mechanism requires no additional space for installing the auxiliary members, the apparatus can be reduced in size.

DETAILED DESCRIPTION OF THE PREFERRED EMBODIMENT

One embodiment of this invention will be described by referring to the various drawing figures.

Figure 1:
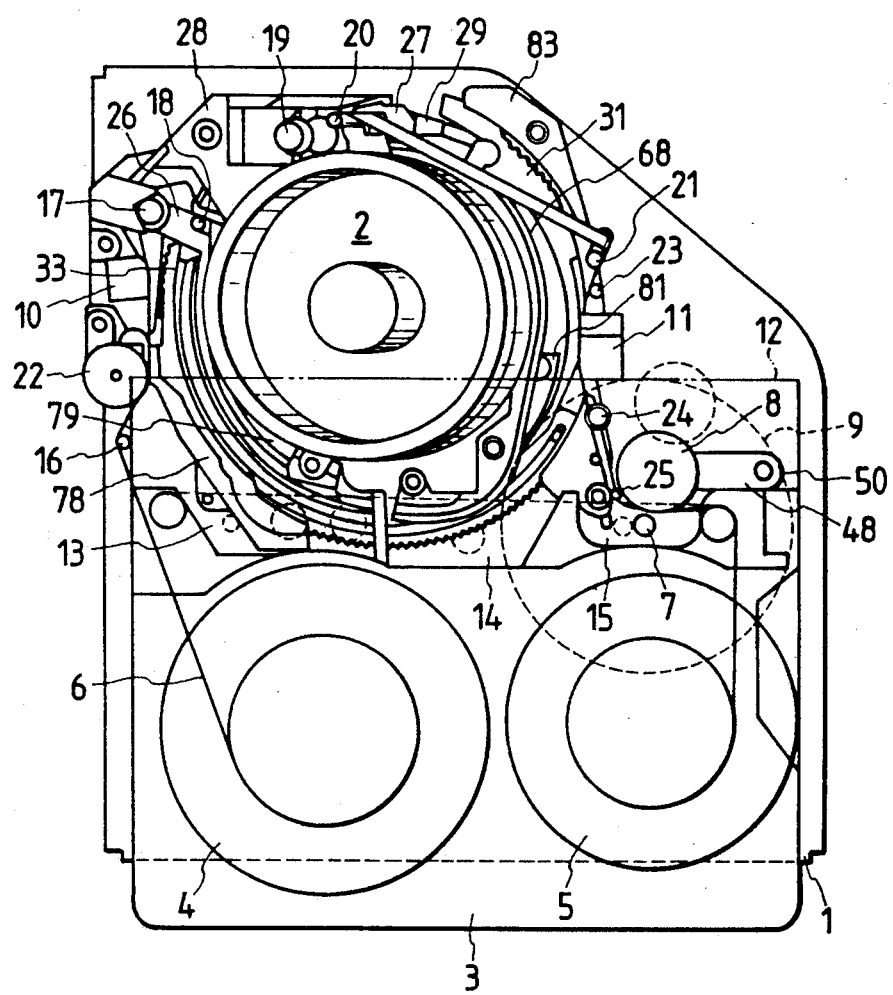
FIG. 1 is a plan view of a tape loading mechanism according to this invention.

FIG. 1 is a plan view showing a magnetic recording and reproducing apparatus that uses a tape loading mechanism of this invention. Reference numeral 1 represents a chassis; 2 a tape guide drum with a magnetic head; 3 a cassette containing a tape 6 wound on a supply reel 4 and a take-up reel 5; 7 a capstan directly coupled at the lower end to a motor 9; 8 a pinch roller; 10 an erase head to erase information from the entire width of the tape 6; and 11 an audio head and control head to record and reproduce audio signals and control signals.

When the cassette 3 is loaded in the apparatus, a cover 12 at the front of the cassette 3 opens. Then a tension pin 16, guide roller 17 and inclined pin 18 are inserted into a space 13; a guide roller 19 and an inclined pin 20 are inserted into a space 14; and an inclined pin 21 and the capstan 7 are inserted into a space 15. These parts assume the positions shown by broken lines and solid lines. At this time, the pinch roller 8 is situated at a position indicated by a broken line.

During the loading operation, each guide moves while drawing out the tape 6. The guide roller 17 and the inclined pin 18 move in unison horizontally and are positioned close to the tape guide drum 2. The guide roller 19 and the inclined pin 20 move in unison horizontally until they reach the audio head and control head 11 and thereafter in a downwardly inclined direction until they are positioned close to the tape guide drum 2, thus winding the tape 6 on the outer circumference of the tape guide drum 2 over the angle of about 270°. The inclined pin 21 moves horizontally from behind the inclined pin 20 and is fixed upstream of the audio head and control head 11 to correct the attitude of the tape 6 and lead it toward the take-up reel 5. As a result, the tape 6 goes out from the cassette 3 and moves past the tension pin 16, impedance roller 22, erase head 10, guide roller 17 and inclined pin 18 and is wound in spiral on the tape guide drum 2 over a specified angle. Then the tape 6 further moves past the guide roller 19, inclined pin 20, inclined pin 21, stationary guide 23, audio head and control head 11, height restriction guide 24 and stationary guide 25 and is clamped between and driven by the capstan 7 and the pinch roller 8 to be wound on the take-up reel 5.

Figure 2A:
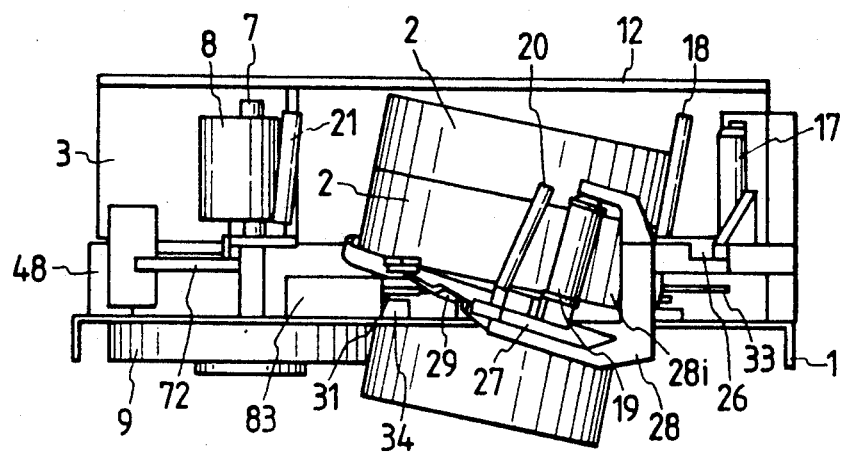
FIGS. 2(a)-2(b) are side views of the mechanism of FIG. 1.
Figure 2B:
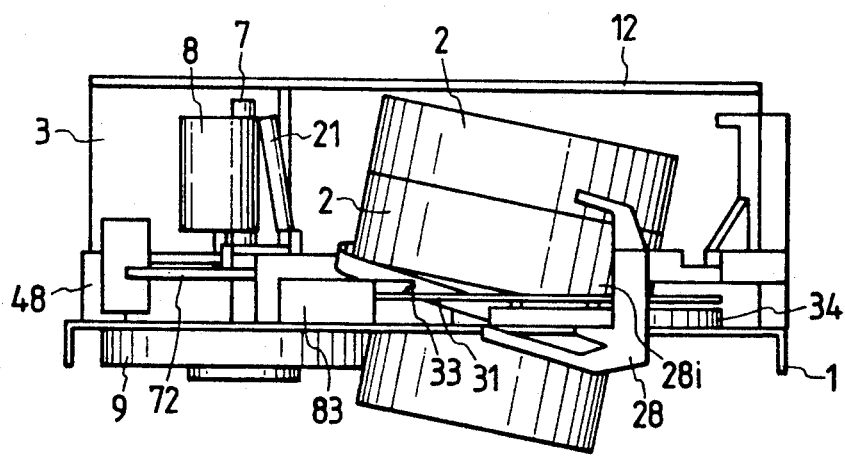

FIG. 2(a) shows the side view of the tape loading mechanism when the loading operation is completed; and FIG. 2(b) shows the side view when the unloading operation is completed. In FIG. 2(a), a guide base 26 has a guide roller 17 and an inclined pin 18 erected thereon and is held in position by a catcher 28. Another guide base 27 also has a guide roller 19 and an inclined guide 20 erected thereon and is held in position by the catcher 28. As shown in the figure, the tape guide on the outgoing side of the tape guide drum 2 is disposed lower than the tape guide on the incoming side by about the width of the tape. This reduces the inclination angle of the tape guide drum 2. Since it is disposed slightly lower than the cassette 3, the tape guide drum 2 is positioned below the cover 12 that opens in front of the cassette 3, contributing to a reduction in size and thickness of the apparatus.

Figure 3:
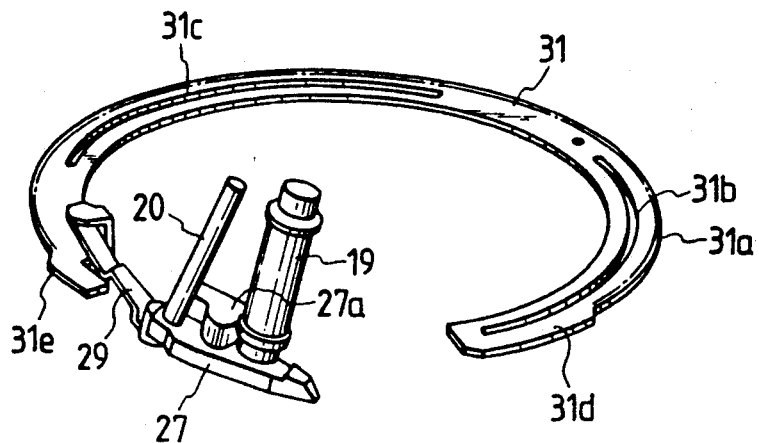
FIGS. 3 and 4 are perspective views of a guide base and a guide base drive member.
Figure 4:
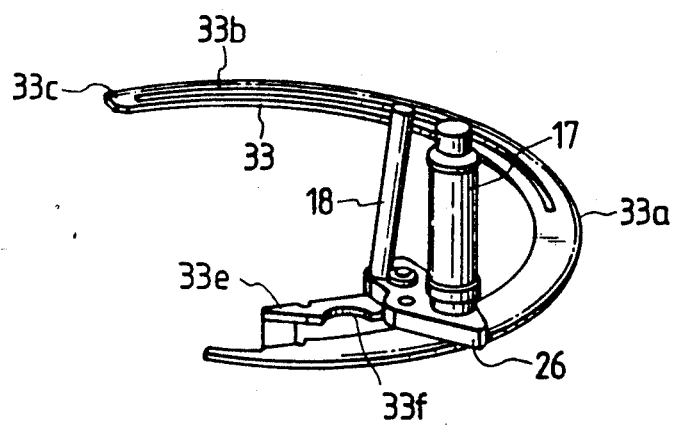
Figure 5:
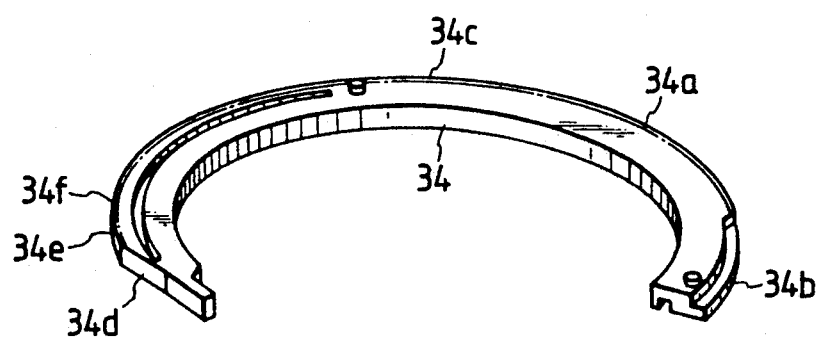
FIG. 5 is a perspective view of a cam.

The loading mechanism will be explained in detail. FIG. 3 shows a guide moving member on the outgoing side. The guide base 27 with guide roller 19 and inclined pin 20 erected thereon is coupled with a connecting plate 29 with a large play. The connecting plate 29 is in turn supported with a large play on one end of an outgoing side drive member 31 as a second drive member. The outgoing side drive member 31 is arc-shaped and has a gear portion 31a formed along its outer circumference. FIG. 4 shows the guide moving member on the incoming side. The guide base 26 with guide roller 17 and inclined pin 18 erected thereon is supported on one end of an incoming side drive member 33 as a first drive member so that it is rotatable in a plane. The incoming side drive member is also arc-shaped and has a gear portion 33a formed along its outer circumference. FIG. 5 shows a cam 34, which consists of upper and lower steps. The upper step is formed with, from right to left, a gear portion 34a and a cam portion 34d. The lower step is formed with a stopper surface 34b which cooperates with a Geneva gear (described later), a cam portion 34c which relates to the mode switching after loading, a cam portion 34f which relates to the loading or unloading process and a cam portion 34e that relates to the mode switching after unloading. The cam 34 as a whole is shaped like an arc. These three members, that is, the incoming side drive member 33 as a first drive member, the outgoing side drive member 31 as a second drive member, and the cam 34 in the order of descent, are mounted concentrically on the chassis.

FIGS. 6(a)-6(e) show the sequence of operation of the incoming side guide base 26 from the unloaded state 6(a) to the loaded state 6(e). The figures transparently shows a catcher 28 involved in the operation of the incoming side guide base 26; guide members 78, 79; cam portions 28j, 28k, 78a, 79b for controlling the attitude of the guide base 26; and a top surface 33e of the bent portion of the incoming side drive member 33 (see FIG. 4).

When assembled, these components are vertically related with each other as follows. A V-shaped groove 28a at the upper part of the catcher 28 cooperates with an upper cylindrical portion 17a of the incoming guide roller 17. The incoming side guide base 26 cooperates with the cam portion 79b of the guide member 79 and the cam portion 28j of the catcher 28. A projection 26b at the lower part of the incoming side guide base 26 cooperates with the cam portion 78a of the guide member 78, a U-shaped groove 28b at the lower portion of the catcher 28 and with a recess 33f in the upper folded portion of the incoming side drive member 33 (see FIG. 4).

Figure 6A:
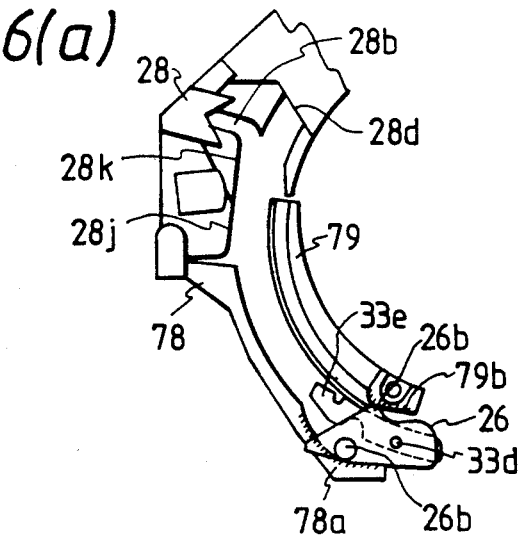
FIGS. 6(a)-6(c) are plane views of the tape loading section on the incoming side.

FIG. 6(a) shows the unloaded state of the tape loading section. The incoming side guide base 26 is rotatably mounted on a pin 33d erected on the input side drive member 33. The clockwise rotation of the guide base 26 about the pin 33d is restricted by the projection 26f of the incoming side guide base 26 abutting against the cam portion 79b of the guide member 79. The counterclockwise rotation is also restricted by the projection 26b at the lower part of the incoming side guide base 26 abutting against the cam portion 78a of the guide member 78. The freedom of rotation of the incoming side guide base 26 about the pin 33d is restricted as described above, that is, the guide base 26 is prevented from turning about the pin 33d.

As the tape loading section enters the state of FIG. 6(b), the rotation of the incoming side guide base 26 about the pin 33d is restricted in the following manner. The clockwise rotation is restricted by the engagement between the lower projection 26b and the recess 33f of the incoming side drive member 33. The counterclockwise rotation is restricted by the engagement between the lower projection 26b and the cam portion 78a of the guide member 78. In this state also, the incoming side guide base 26 is prevented from rotating about the pin 33d.

Figure 6D:
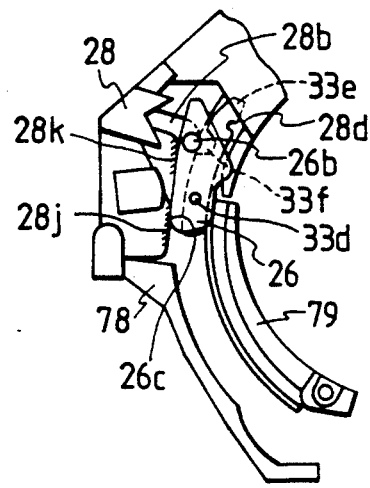
Figure 6B:
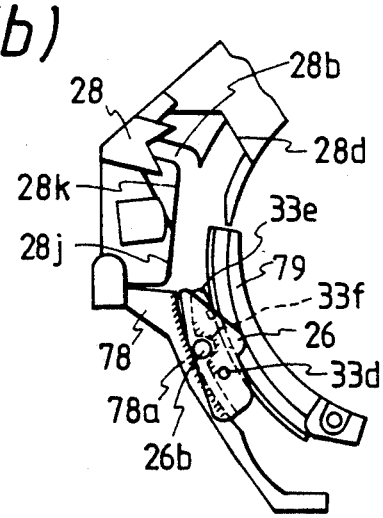
Figure 6E:
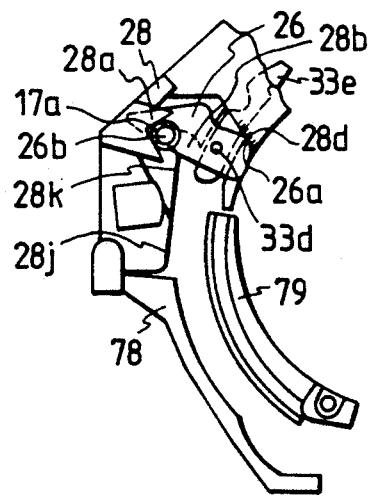
Figure 6C:
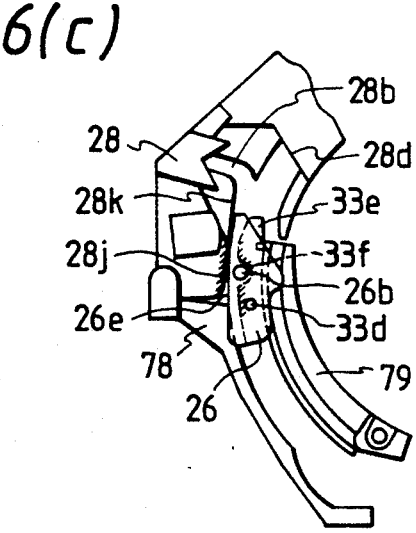

When the tape loading section assumes the condition of FIG. 6(c), the clockwise rotation of the incoming side guide base 26 is restricted by the engagement between the lower projection 26b and the recess 33f of the incoming side drive member, while the counterclockwise rotation is restricted by the engagement between the left side surface 26e of the incoming side guide base 26 and the cam portion 28j of the catcher 28. In this way, the guide base 26 is prevented from rotating about the pin 33d.

FIG. 6(d) shows the state immediately before the lower projection 26b enters the U-shaped groove at the lower portion of the catcher 28. The counterclockwise rotation is restricted by the engagement between the lower projection 26b and the cam portion 28k of the catcher 28. The clockwise rotation of the incoming side guide base 26 is restricted by the engagement, at a position below the pin 33d in this figure, between the rear left portion 26c of the incoming side guide base 26 and the cam portion 28j of the catcher 28. This construction is characterized by the restriction of the clockwise rotation of the guide base 26. That is, the rotation of the incoming side guide base 26 is prevented by the direct contact between the guide base 26 and the front and rear cam portions of the catcher 28, the front and rear cam portions being located in front of and behind the rotating shaft or pin 33d with respect to the direction of travel.

Why this method is taken is explained below. When the tape loading section shifts to the tape-loaded state as shown in FIG. 6(e), the incoming side guide base 26 rotates counterclockwise about the pin 33d. At this time, if a construction is used which has a member that engages with the right side of the incoming side guide base 26 at a point in front of the pin 33d with respect to the direction of travel, when the incoming side guide base 26 moves into the state of FIG. 6(e), the guide base 26 is interfered with by that member. Also, if the incoming side guide base 26 is restricted by the direct contact between the lower projection 26b and the recess 33f, as in the case of FIG. 6(b) and 6(c), there will be a play in the clockwise direction in this state of FIG. 6(d) because the incoming side drive member 33 is made smaller in diameter to reduce the size of the mechanism and thus curved away from the lower projection 26b. In the state of FIG. 6(d), the lower projection 26b must be led toward the loading completion position and into the U-shaped groove 28b at the lower portion of the catcher 28. Therefore, the clockwise play should not be allowed. The direct contact between the rear left portion 26c and the cam portion 28j permits the incoming side guide base 26 to smoothly and reliably shift into the loaded condition without producing any interference.

Then, as shown in FIG. 6(e), the head portion 17a of the incoming side guide roller is pressed against the V-shaped groove 28a of the catcher 28. At the same time, the rear right portion 26a of the incoming side guide base 26 is pressed against the inclined wall 28d of the catcher 28, thus completing the loading operation.

Figure 7:
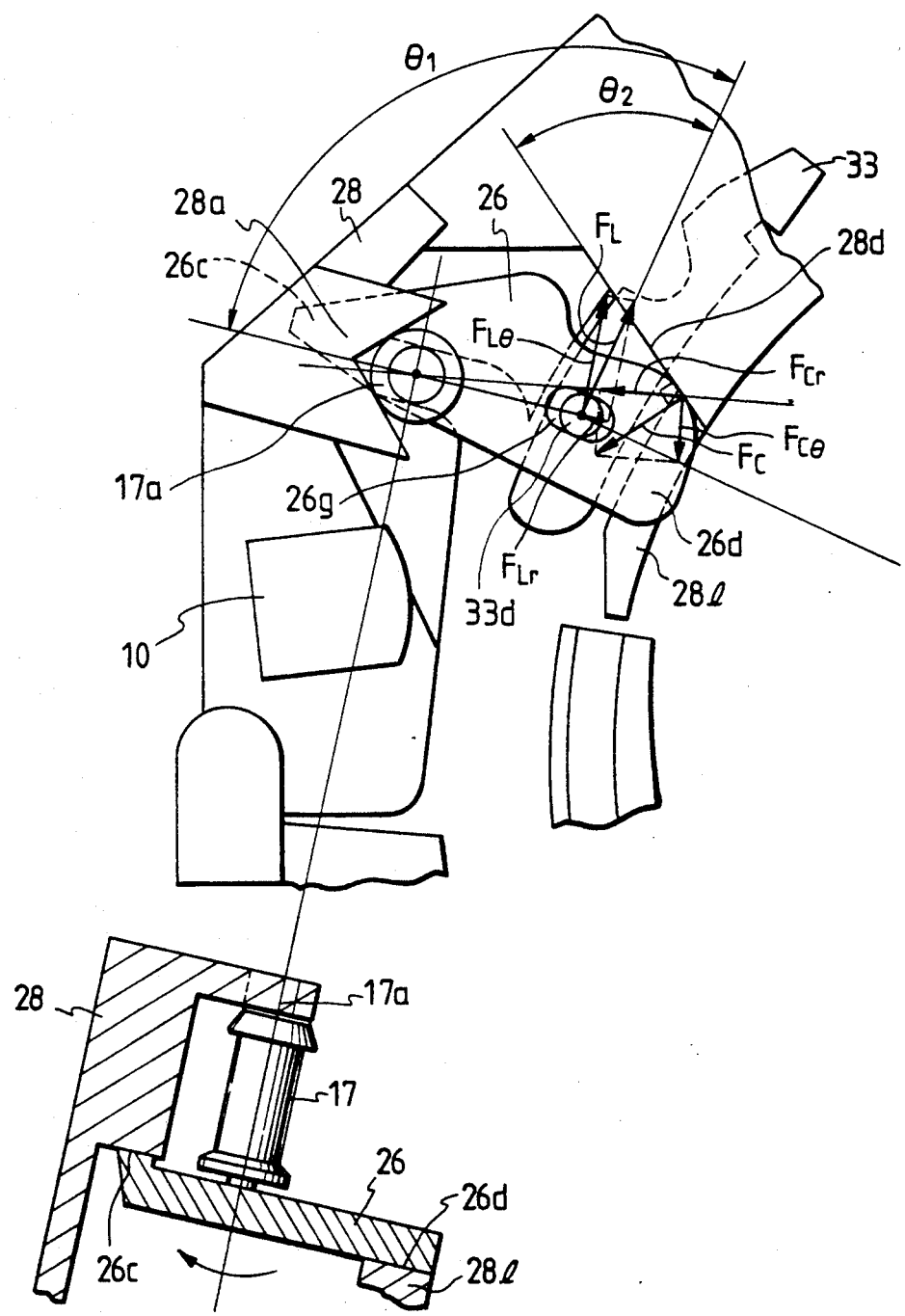
FIG. 7 is a plan and side view showing details of FIG. 6(e)

The detail of FIG. 6(e) is shown in FIG. 7.

The incoming side drive member 33 is made small in diameter to reduce the size of the mechanism. The drive force $F_L$ makes an obtuse angle $\theta_1$ with the direction in which the head portion 17a of the incoming side guide roller is pressed against the catcher's V-shaped groove 28a. Thus, in this condition no force is produced which will press the head portion 17a against the V-shaped groove 28a. To overcome this situation, the guide base 26 is directly pressed against the wall 28d which makes an acute angle $\theta_2$ with the drive force $F_L$. As a result, the guide base 26 receives a reaction $F_C$ from the wall 28d. $F_L$ and $F_C$ are divided into components $F_{L\theta}$, $F_{C\theta}$ that tend to rotate the guide base 26 about the guide roller head portion 17a and into $F_{Lr}$, $F_{Cr}$ that act toward the center of the head portion 17a. $F_{L\theta}$ and $F_{C\theta}$ balance each other as the rotating forces about the head portion 17a of the guide roller. When the remaining forces $F_{Lr}$ and $F_{Cr}$ are compared, the construction is so set that the following relationship holds.

$$F_{Cr} << F_{Lr}$$

By combining these forces, it is possible to produce a resultant force that presses the head portion 17a against the V-shaped groove 28a. The pin 33d engages with a slot 26g formed in the incoming side guide base 26 that extends toward the guide roller 17, so that the pin 33d will not obstruct the resultant force that presses the head portion 17a against the V-shaped groove 28a. This resultant force, as shown at the lower part of FIG. 7, tends to cause the guide base 26 to turn counterclockwise in the figure about the head portion 17a, thus positioning the guide base 26 in the predetermined attitude and height.

(1) In FIG. 7, to provide a sufficient tape winding angle to the full-width erase head 10, the effective method is by rotating the guide base 26 counterclockwise in the figure until it becomes as nearly horizontal as possible and positioning the guide roller 17 as far left as possible.

(2) To reduce the size of the mechanism, the drive member 33 needs to be reduced in diameter.

The above items (1) and (2) both increase the angle $\theta_1$ in FIG. 7. With this embodiment, it is possible to reliably press the head portion 17a of the guide roller against the V-shaped groove 28a of the catcher.

While in this embodiment an inclined surface is formed on the catcher side for engagement with the rounded portion of the guide base 26, it may be possible to form the inclined surface on the guide base side and provide an arc portion on the catcher side for direct engagement with the inclined surface.

In the construction, there is no need to preassemble the guide members 78, 79 in such a way that they engage with the guide base 26. Instead, the components may be assembled by stacking them successively in one direction from above, greatly improving the assembly work efficiency.

A further advantage of this construction is that, as explained in FIG. 6(d), when the guide base is rotated through large angles to complete the loading, the guide base is prevented from being interfered with by the guide member, ensuring a reliable loading operation.

With this construction, a sufficient tape winding angle for the full-width erase head can be secured in a small and compact mechanism and the full-width erase head can be made stationary. This in turn increases the rigidity of the mechanism that supports the full-width erase head, reducing the adverse effects of vibration and improving the stability of tape travel. Another feature of this construction is that since the full-width erase head is held stationary, the number of parts for supporting the erase head decreases and high precision can be maintained during assembly. This in turn alleviates the precision requirement of each component, contributing to a reduction in the machining and assembling time. Thus, a significant cost reduction is achieved.

Figure 8:
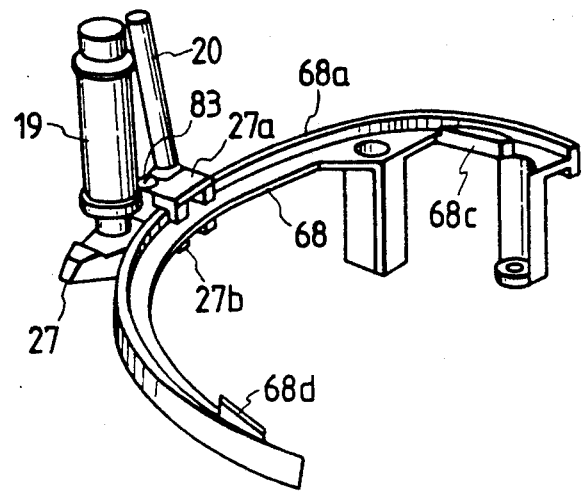
FIGS. 8 and 9 are perspective views of a guide base guiding member on the outgoing side.
Figure 9:
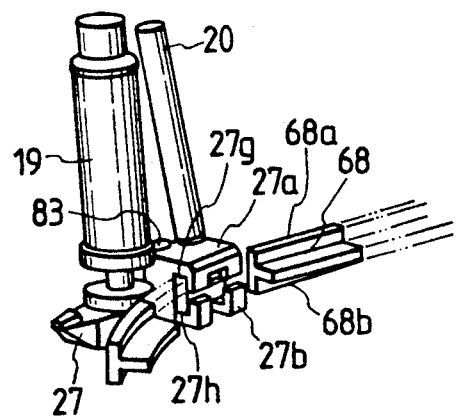

FIG. 8 is a perspective view showing the guide member 68 for a group of tape guides and how an outgoing side guide base 27 is supported by the guide member 68. The guide member 68 is shaped like a letter T in cross section. The guide base 27 has claw portions 27a, 27b which clamp the T-shaped portion of the guide member 68 to restrict the travel path of the guide base 27. The vertical restriction, i.e., a restriction in a direction perpendicular to the plane of the guide base 27 is achieved by clamp portions 27g, 27h of the guide base 27 holding projections 68a, 68b of the guide member 68, as shown in FIG. 9.

Figure 10A:
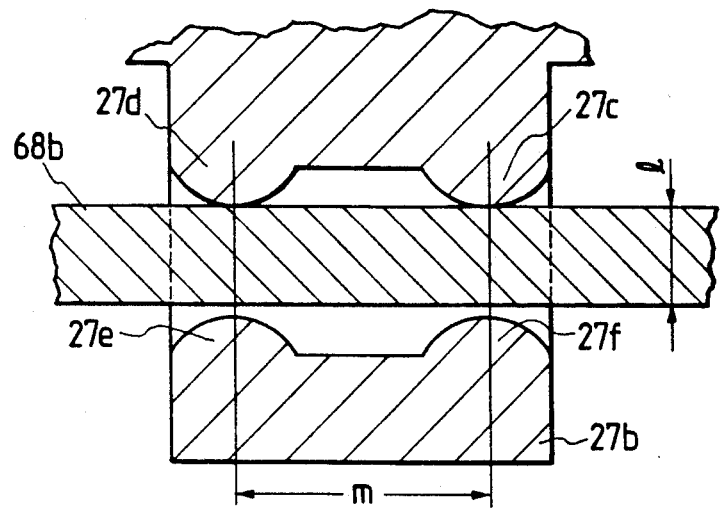
FIGS. 10(a)-10(b) are detailed cross-sectional views showing an engagement between the guide base guiding member and the guide base on the outgoing side.
Figure 10B:
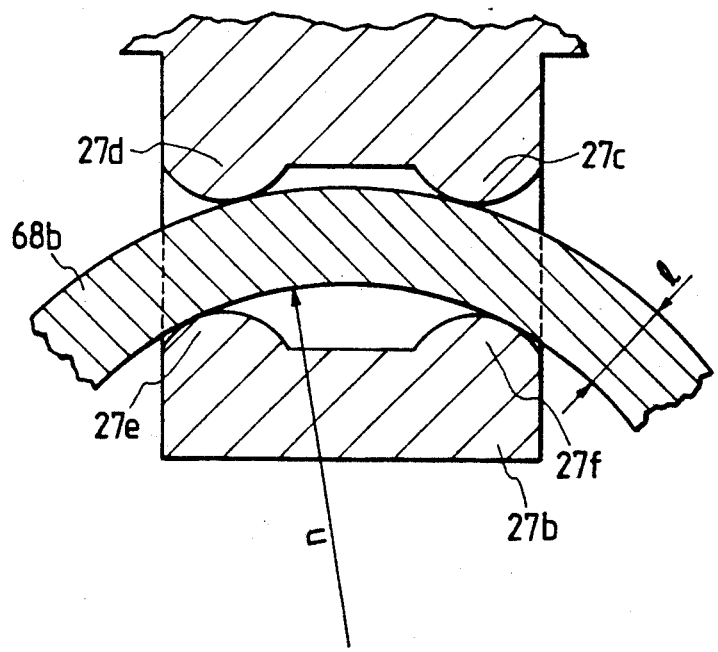
Figure 11:
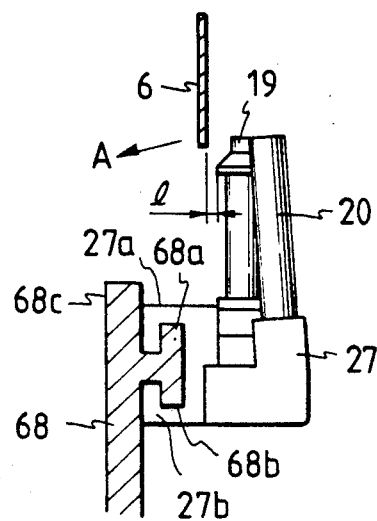
FIG. 11 is a side view showing the positional relationship between the tape and the guide base when a cassette is loaded.

Next, we will explain about the restriction on the movement of the guide base 27 in a direction parallel to the plane of the guide base 27, i.e., the horizontal restriction. FIGS. 10 and 11 show the cross section of the lower projection 68b of the guide member 68 and the lower clamp portion 27b of the guide base 27. The lower clamp portion 27b of the guide base 27 has four arc projections 27c to 27f that engage with the lower projection 68b. This same structure is also used with the upper clamp portion 27a of the guide base 27. Thus, the guide member 68 is clamped on each side at a total of four locations. The fact that the guide base 27 is formed with the arc projections for engagement with the guide member 68, as shown in FIG. 10, provides the following advantages. That is, whether the guide member 68 is straight as shown in FIG. 10(a) or curved in arc as shown in FIG. 10(b), the arc projections 27c to 27f of the guide base 27 clamp the guide member 68 with only a small constant clearance between them or in a line contact so that the guide base 27 can be held with good stability.

The guide member 68 is provided, as shown in FIG. 11, with a wall 68c facing the claw portion 27a of the guide base 27. The wall 68c has a small clearance between and the claw portion 27a when the outgoing side guide base 27 is inserted into the space 14 of the cassette 3, i.e., during the cassette loading mode as shown in FIG. 1. The provision of the wall 68c keeps the guide base 27 from falling in the direction of A in FIG. 11 when the apparatus is tilted during cassette loading, because when the guide base 27 is tilted, the guide base claw portion 27a engages against the wall 68c, keeping the distance l between the guide roller 19 and the tape 6 constant. The position of the tape 6 shown in FIG. 11 corresponds to the state of the tape 6 shown dotted in FIG. 1.

Figure 12:
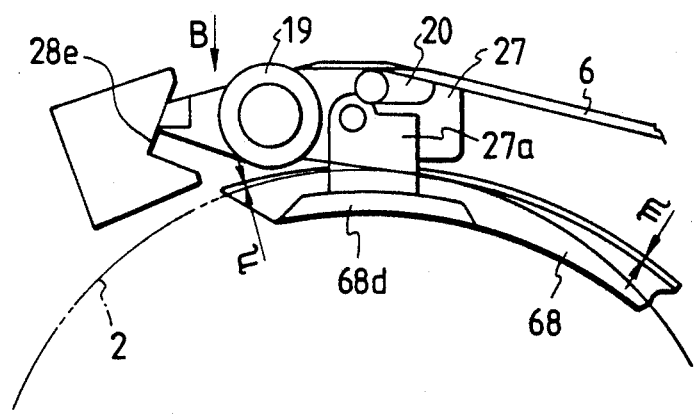
FIG. 12 is a plan view of the catch and the guide base immediately before the guide base on the outgoing side is positioned.

FIG. 12 is a plan view of the guide base 27 immediately before the loading operation is completed. With the loading completed, the guide base 27 is positioned in the catcher 28. For this purpose, the claw portion 27a of the guide base 27 and the guide member 68 must be kept in an unstrained relationship during this part of the operation. Therefore, the width n of the guide member 68 for this part of the operation is made smaller than the width m of the guide member 68 for the remaining part of the loading operation. Because the width of the guide member 68 is small immediately before the completion of the loading operation and because of the back tension of the tape 6 and the attitude of the apparatus, the tape guide 27 is urged toward the tape guide drum 2 in the direction of B in FIG. 12. However, the provision of a wall 68d to the guide member 68, as shown in FIG. 12, prevents the guide base 27 from falling toward the tape guide drum 2 and thereby keeps the guide roller 19 from contacting the tape guide drum 2 as during the cassette loading mode. With the loading completed, the claw portion 27a of the guide base 27 and the wall 68d of the guide member 68 are out of contact with each other. While in this embodiment we have described a case of the outgoing side tape guide, the same process also applies to the incoming side tape guide.

Next, we will detail the cam operation mechanism used in this embodiment.

Figure 13A:
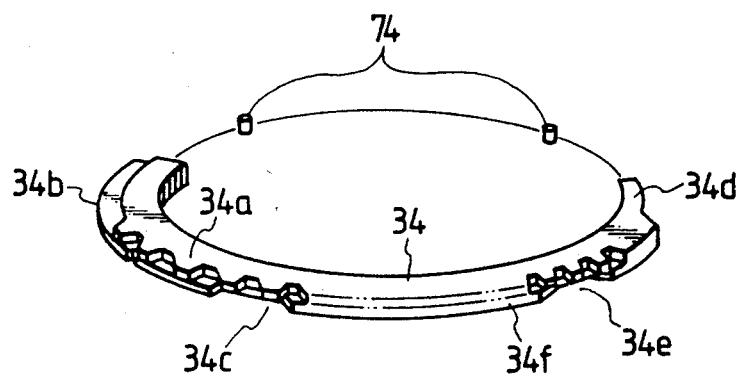
FIGS. 13(a)-13(b) are perspective views of a cam.
Figure 13B:
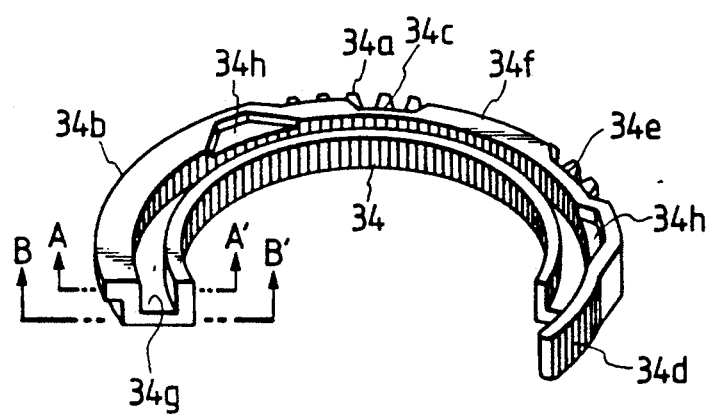

The structure of the cam 34 as seen from the above is shown in FIG. 13(a). FIG. 13(b) shows the cam upside down.

The cam 34 is formed at the underside with an engagement groove 34g with which guide pins 74 erected on the chassis 1 engage. There are two in-groove cam portions 34h, which are recesses formed into the outer circumferential wall of the engagement groove 34g. The in-groove cam portions 34h are formed shallower than the engagement groove 34g.

Figure 14A:
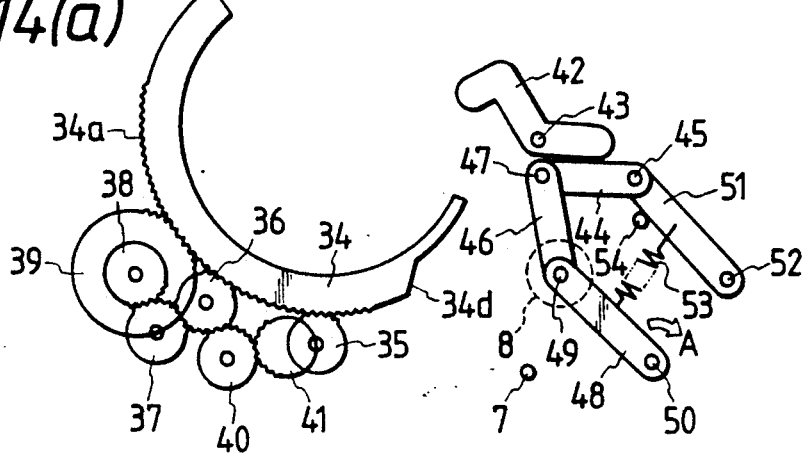
FIGS. 14(a)-14(c) are plan views showing the operation of a pinch roller pressing mechanism.
Figure 14B:
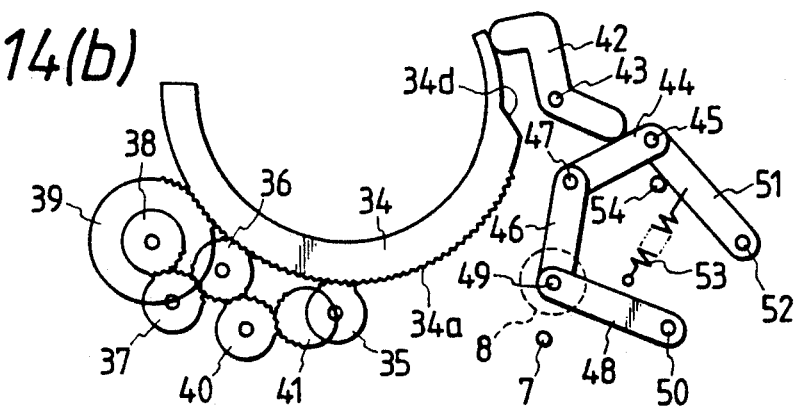
Figure 14C:
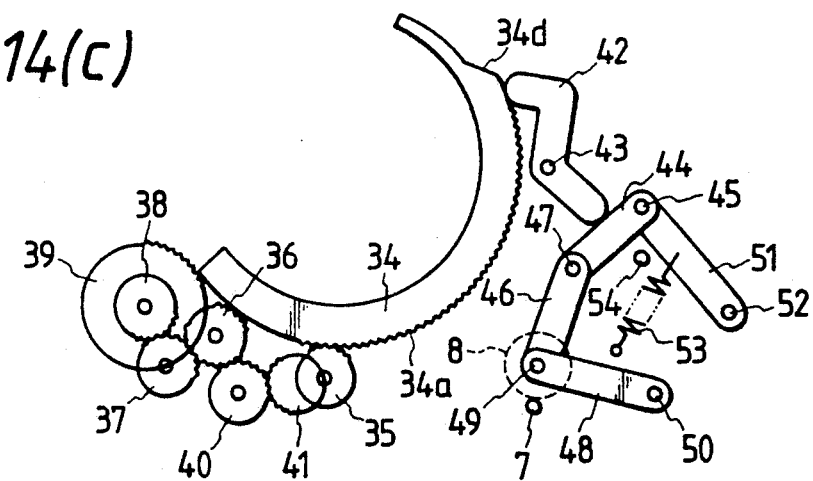

FIG. 14 shows the cross section of the cam 34 taken along the line B-B' of FIG. 13(b) and the associated drive system. FIG. 14(a) represents the unloaded state, (b) represents the state during the process of loading or unloading, and (c) represents the loaded state. The cam 34 is driven by a gear 35 which is driven by a power source (not shown) and in mesh with the gear portion 34a. As the cam 34 rotates, a gear 36 in mesh with the gear portion 34a is rotated. The rotation of the gear 36 is then transmitted through gears 37, 38 to a gear 39 which is rotated together with the gear 38 through a pressing spring (not shown). The gear 39 is in mesh with the gear portion 31a and drives the outgoing side drive member 31. The rotation of the gear 36 is also transmitted through gears 40, 41 to a gear 77 which incorporates a pressing spring (not shown). The gear 77 is in mesh with the gear portion 33a and drives the incoming side drive member 33. In a state (c) where the loading is completed, the gear 36 is stopped by the Geneva gear described later and disengaged from the gear portion 34a. In a state (b) where the loading is being performed, an arm 42 is engaged with the front end of the cam 34 and rotated about a shaft 43, causing an arm 44 to rotate about the a shaft 45. The arm 44 is linked with an arm 48 through a shaft 47, arm 46 and shaft 49 and moves the pinch roller 8 rotatably mounted on the arm 48 to the loading position. The arm 48 is urged in the direction of arrow A by a spring, so that when the cam 34 and the arm 42 are out of engagement as in the state (a), the pinch roller 8 is retracted to the unloaded position. As the cam 34 is further rotated from the state (b) to reach the state (c), the arm 42 is engaged with the cam portion 34d, causing the toggle mechanism formed of arms 44 and 46 to press the pinch roller 8 against the capstan 7. The shaft 45 is erected from an arm 51 which is supported on a shaft 52. The arm 51 is always pulled by a spring 53 and is restricted by a stopper 54. Since the arm 42 continues to be turned after the movement of the pinch roller 8 has stopped, the arm 51 parts from the stopper 54 against the force of the spring 53. This provides the pressing force between the pinch roller 8 and the capstan 7.

FIG. 15 shows the cross section of the cam 34 taken along the line A-A' of FIG. 13 and the mode switching mechanism. (a) shows the unloaded state, (b) shows the state during the process of loading or unloading, and (c) shows the loaded state. Denoted 36a is a Geneva gear integrally formed with the gear 36. First, we will explain about arms (mechanism element) 55, 60 that are in contact with the outer circumference of the cam 34. The arm 55 has its end in contact with the cam portion 34c and is urged counterclockwise about a shaft 56 by a spring 57. The other end of the arm 55 is fitted with a brake member 58 that applies a braking force to a supply reel table 59. The arm 60 is engaged with the cam portion 34c and urged clockwise about a shaft 62 by a spring 61 attached at one end. The arm 63 has an arm 63a adapted to be engaged with a shaft 60a on the arm 60. The arm 63 is urged counterclockwise about a shaft 62 by a spring 65 attached at one end. The other end of the arm 63 is fitted with a brake member 64 that applies a braking force to a drive disk 66 engaged with the take-up reel 5. FIG. 15(a) shows the state of rest after being unloaded, in which the arm 55 is engaged with the cam portion 34f, releasing the supply reel table 59. The arm 60 is engaged with the cam portion 34f, disengaging the shaft 60a from the arm 63a against the force of the spring 61. As a result, the force of the spring 65 applies a braking force to the drive disk 66. The braking force thus applied does not depend on the stroke of the cam portion 34c and is therefore stable. In the state of FIG. 15(b), the arms 55 and 60 are engaged with the cam portion 34f and thus only the supply reel table 59 is released from the brake. For loading, the tape 6 is basically fed out from the supply reel side. FIG. 15(c) shows the state of recording or reproducing mode. In this state, the supply reel table 59 is applied with a braking force. At this time, since the arm 55 is not directly engaged with the cam portion 34c, the braking force is independent of the stroke of the cam portion 34c and is determined by the force of the spring 57 alone and thus stable. The arm 60 is rotated by the spring 61 to engage with the cam portion 34c. The shaft 60a is engaged with the arm 63a and rotates the arm 63 against the force of the spring 65, releasing the drive disk 66 from the brake. At this time, the Geneva gear 36a engages with the stopper surface 34b, stopping the rotation of the gear 36, which in turn brings the drive members 31 and 33 to a halt.

At the same time, the pressing force for urging a group of tape guides against the positioning members is also maintained. In this way, the motion of the cam 34 is transmitted to the drive members through a switching mechanism such as a Geneva gear, making it possible to increase the number of operation modes.

Figure 15A:
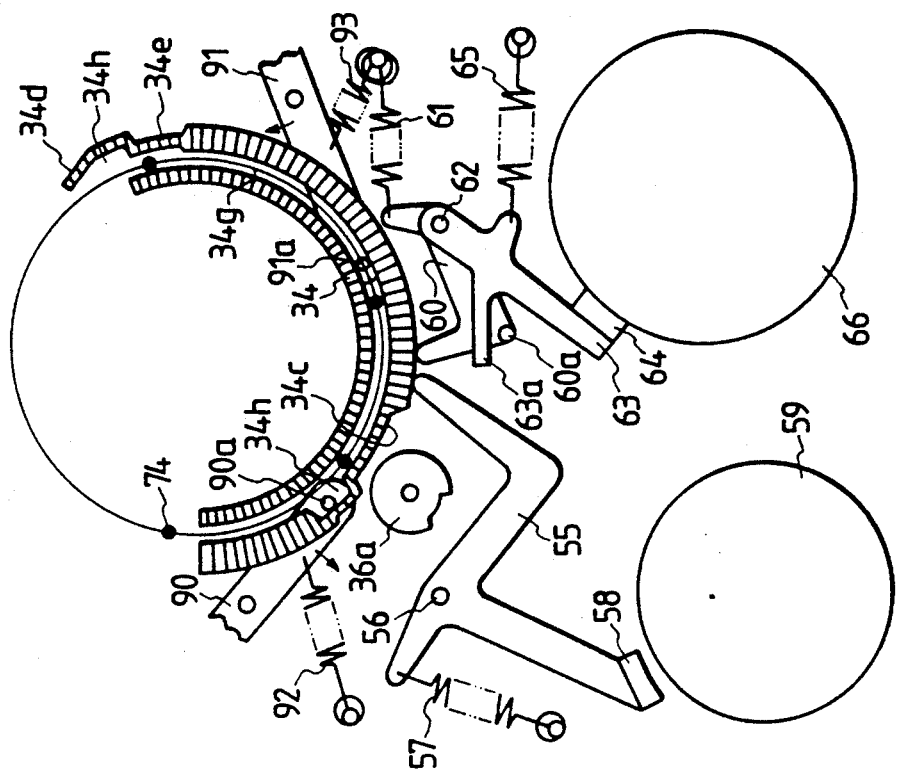
FIGS. 15(a)-15(c) are plan views showing the structure and operation of a mode switching section.
Figure 15B:
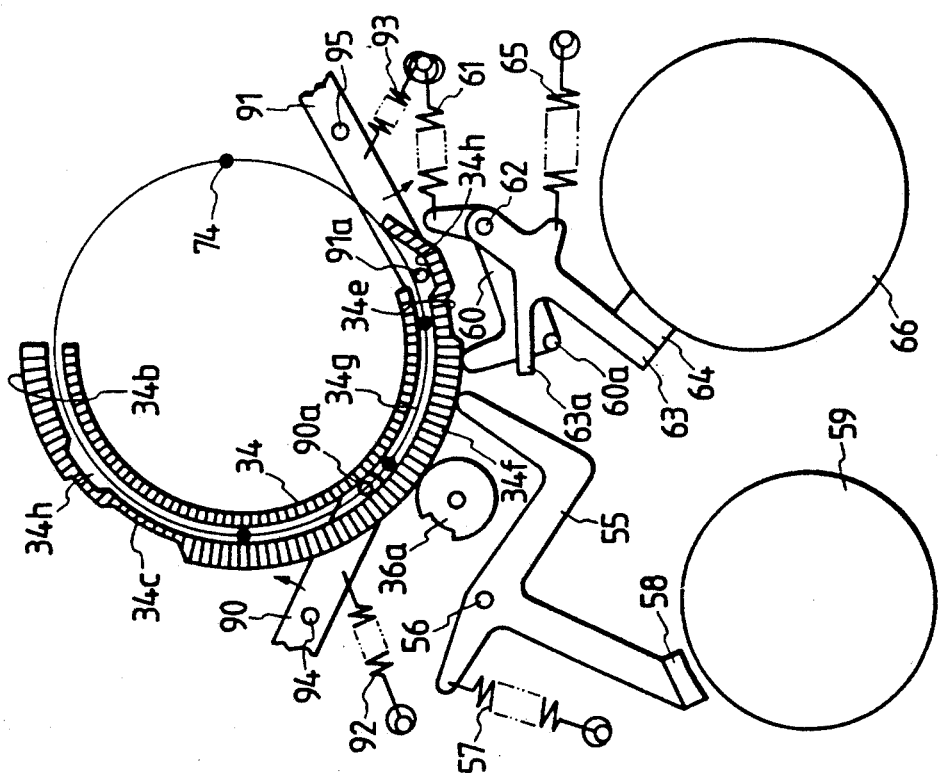
Figure 15C:
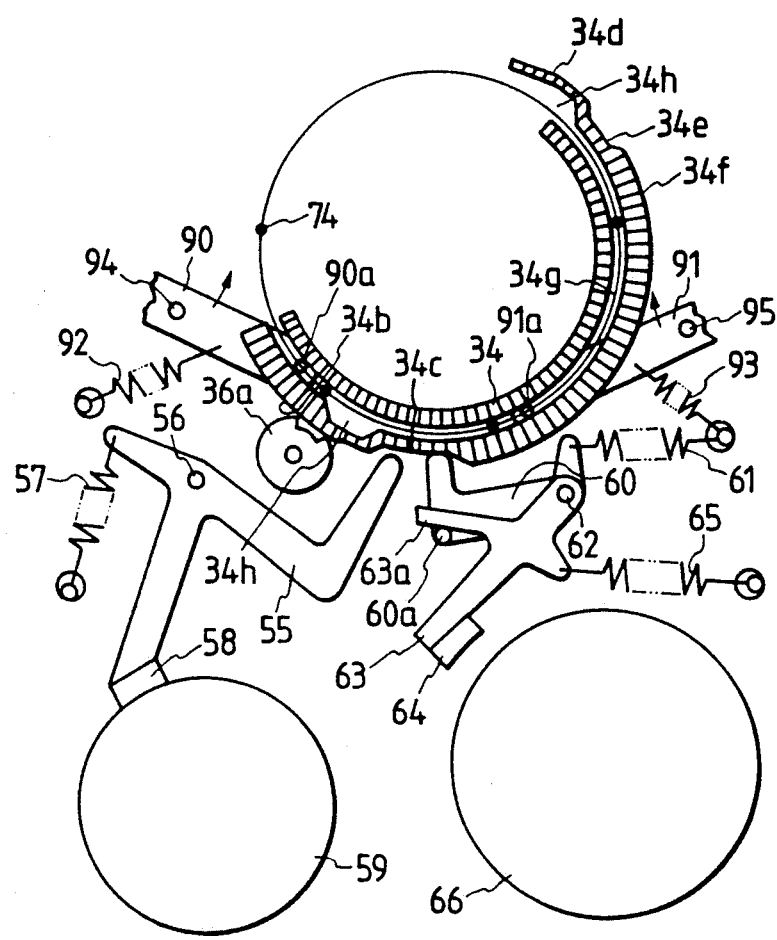
Figure 15D:
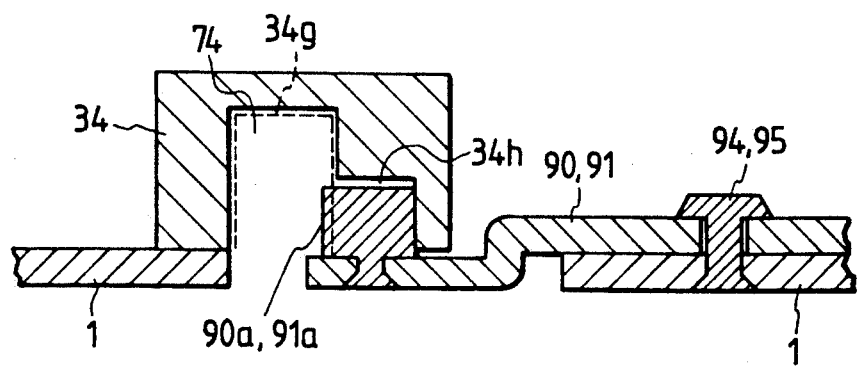
FIG. 15(d) is a cross-sectional view showing how arms engage an engagement groove in a cam in connection with FIGS. 15(a)-15(c)

Now, we will explain about arms 90, 91 that engage with the interior of the engagement groove 34g of the cam 34, by referring to FIG. 15(d).

The arms 90, 91 have cam pins 90a, 91a attached at one end which are engaged with the inner side wall of the groove 34g of the cam 34 or with the in-groove cam portion 34h. The arms 90, 91 are urged clockwise and counterclockwise, respectively, about shafts 94, 95 on the chassis 1 by springs 92, 93 attached to the intermediate portion of the arms. The other end of the arm 90 is connected with a rotating mechanism of the tension control arm and the other end of the arm 91 is connected with a tape winding torque changing mechanism. These devices are not directly related to the cam operating mechanism of this invention, and their descriptions are omitted.

The cam pins 90a, 91a, as shown in the cross section of FIG. 15, are projected from under the cam 34 into the engagement groove 34g for engagement. The cam pins 90a, 91a are formed short so that they can engage with and follow the in-groove cam portion 34h which is formed shallower than the engagement groove 34g. The guide pins 74 of the cam 34 are inserted deep into the engagement groove 34g so that they will not engage with the in-groove cam portion 34h. Thus, the cam 34 is kept smoothly rotatable along the groove 34g.

The arm 90 is a mechanism element which is acted upon during the process of loading (FIG. 15(b)) and the arm 91 is another mechanism element which is acted upon during the process of unloading.

As shown in FIG. 15, the cam pin 90a of the arm 90 falls into the in-groove cam portion 34h only during loading. The cam pin 91a of the arm 91 falls into the in-groove cam portion 34h only during unloading. These cam pins are connected to associated transmission mechanism so that they can perform specified actions when dropped into the in-groove cam portion 34h.

In this embodiment, the in-groove cam portions 34h with which the cam pins 90a, 91a are engaged are positioned along the circumference of the cam in such a way that they are staggered with respect to the outer periphery cam portions 34c, 34e, in order to reduce the size of the apparatus. This reduces the thickness of the cam 34, that is, the distance from the engagement groove 34g to the outer circumferential surface, to the minimum that can accommodate the depths (or steps) of the outer periphery cam portions 34c, 34e. The in-groove cam portions 34h require only a depth equal to or less than those of the outer periphery cam portions 34c, 34e for operation. Since the outer periphery cam portions and in-groove cam portions are staggered along the circumference, the thickness of the cam 34 in the radial direction is not increased. Furthermore, because the cam 34 is continuous without a break in the radial direction, it is possible to form additional cam patterns on the inner or outer circumferential surface.

Figure 16:
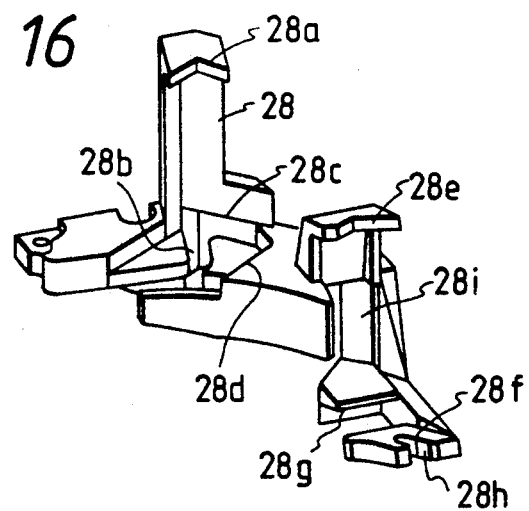
FIG. 16 is a perspective view of a catcher.

FIG. 16 shows the perspective view of the catcher 28. The catcher 28 is formed in one piece and so constructed as to position tape guiding members on the incoming and outgoing side of the tape guide drum 2. On the outgoing side, the position and the angle of the guide roller 19 are determined by the V-shaped groove 28e and U-shaped groove 28f. The height of the guide roller 19 is determined by the stopper surface 28g. The inclination of the inclined pin 20 is restricted by the wall 28h. Between the V-shaped groove 28e and the U-shaped groove 28f of the catcher 28 is formed a notch portion 28i.

In the unloaded state as shown in FIG. 2(b), one end of the cam 34 and one end of the outgoing side drive member 31 pass through the notch portion 28i. During the loading operation these members escape from the notch portion 28i. So, at the completion of loading, the guide roller 19 and the inclined pin 20 can be held in a specified attitude in the notch portion 28i. Therefore, the guide roller 19 and the inclined pin 20 do not interfere with the movement of the cam 34 and the outgoing side drive member 31.

Figure 17:
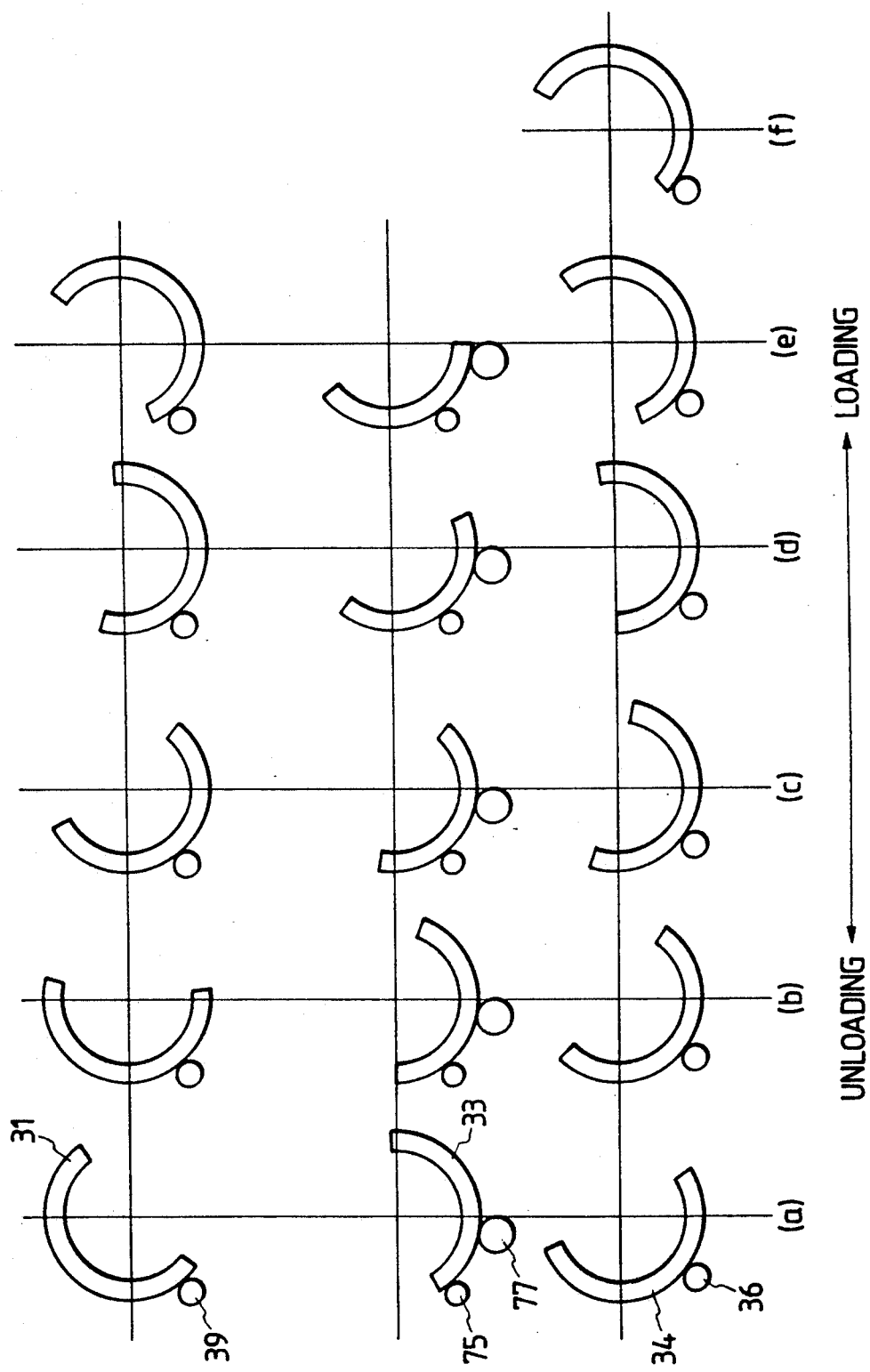
FIG. 17 is a model diagram showing the rotational relationship between the guide base drive member and the cam.

FIG. 17 shows the combined operation of the aforementioned two drive members 31, 33 and the cam 34. FIG. 17(a) represents the state of ejection, (e) the loaded state, and (f) the state for recording or reproducing. Each of the members is shown simplified as an arc. As shown in FIG. 15, as the cam 34 rotates, the incoming side drive member 33 rotates in a reverse direction and to an almost equal extent. The outgoing side drive member 31 rotates in the same direction as with the cam 34 but at almost twice the speed of the cam 34.

Figure 18A:
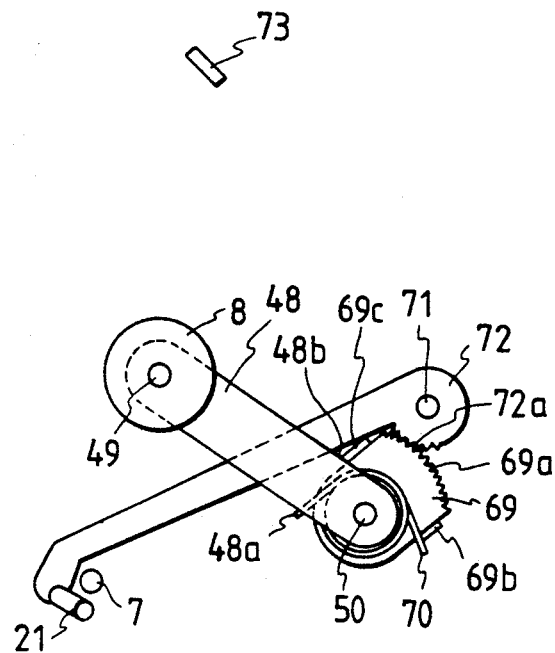
FIGS. 18(a)-18(b) are plan views showing the operation of an inclined pin pressing mechanism.
Figure 18B:
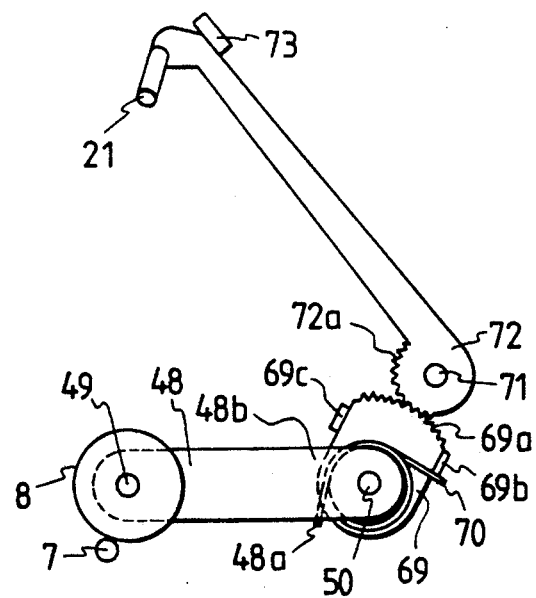

FIG. 18 shows the mechanism for moving the inclined pin 21, located on the outgoing side. FIG. 18(a) shows the state corresponding to the unloaded state of FIG. 14(a). The gear 69 rotatably supported coaxially with the arm 48 is urged by a spring 70 whose ends are engaged with the bent portion 69b of the gear 69 and with the left side 48a of the arm 48 so that right side 48b of the arm 48 is pressed against the bent portion 69c of the gear 69. As the arm 48 is rotated to shift the mode from this state to the state of FIG. 18(b) corresponding to that of FIG. 14(c) and to press the pinch roller 8 against the capstan 7, the arm 72 which has a gear portion 72a in mesh with a gear portion 69a of the gear 69 is rotated until the inclined pin 21 erected at the end of the arm 72 is positioned at a specified location by the catcher 73. After the inclined pin 21 has been positioned, the arm 48 is further rotated parting from the bent portion 69c of the gear 69 against the force of the spring 70, as shown in FIG. 18(b). This provides a force for pressing the inclined pin 21 against the catcher 73. Driving the inclined pin 21 as explained above causes the inclined pin 21 to be loaded from the back of the guide base 27. That is, the locus of the inclined pin 21 and that of the guide base 27 partially overlap each other. The position of the arm 48 and the reduction ratio of the drive system for the arm 72 are set so that the guide base 27 is activated earlier and passes the overlapped portion before the inclined pin 21 does. In this way, the motion of the arm 72 is controlled according to the movement of the cam 34, avoiding the interference between these two members at the overlapped portion.

Figure 19:
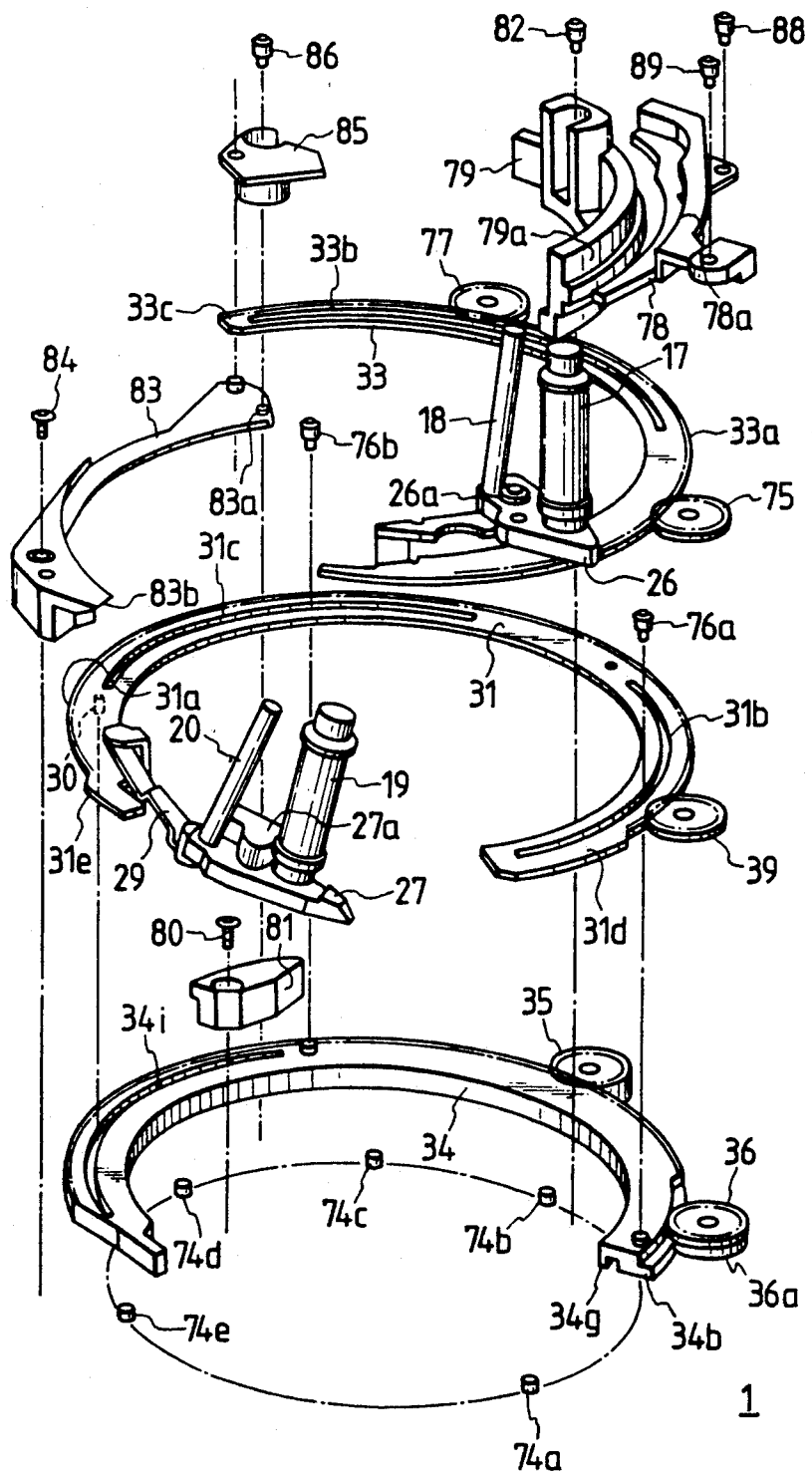
FIG. 19 is an exploded perspective view showing the components of the loading mechanism.

As explained above, the mode switching of the loading mechanism in this apparatus is carried out mainly by the incoming side drive member 33, the outgoing side drive member 31 and the cam 34. FIG. 19 shows the perspective view of an assembly made up of the above three arc members. The cam 34 is guided rotatably on the chassis 1 by the guide pins 74a to 74e erected on the chassis 1 that engage in the groove 34g formed in the underside of the cam 34 over the entire circumference. The guide pins 74a to 74e are arranged so that three or more of them are engaged in the groove 34g of the cam 34 at all times in the rotating range of the cam 34 that is shown in FIG. 17. The outgoing side drive member 31 is rotatably supported on the cam 34 by guide pins 76a, 76b. Through the engagement between the guide pins 76a, 76b and the slots 31b, 31c in the outgoing side drive member 31 and through the engagement between the pin 30 erected at the underside of the outgoing side drive member 31 and the slot 34i in the cam 34, the outgoing side drive member 31 is made rotatable concentrically with the cam 34. The incoming side drive member 33, as shown in FIG. 17, has a small rotating angle and the gears 75, 77 are always in mesh with the gear portion 33a on the outer circumference of the drive member 33. The outgoing side drive member 31 and the cam 34, as shown in FIG. 17, rotate in the same direction through the angle of about 180° or more. As shown in FIG. 19, the base for supporting the outgoing side drive member 31 so that it can rotate thereon is replaced by the cam 34. This reduces the angle of slots 31b, 31c formed in the outgoing side drive member 31 to only the difference in rotating angle between the outgoing side drive member 31 and the cam 34. In conventional apparatuses, when a ring that rotates through the angle of 180° or more is to be supported on the base, the slot formed in the ring must be 180° or more. With this embodiment, however, the angle of slot can be reduced, minimizing such problems as plays and strength of the ring. The guide members 78, 79, 81 are fastened to the chassis 1 by screws 88, 89, 82, 80 to restrict the vertical play for the cam 34. A holder 83 is interposed between the incoming side drive member 33 and the outgoing side drive member 31. The holder 83 is fastened to the chassis 1 by a screw 84 and has a boss 83a integrally formed therewith which engages with a long groove 33b in the incoming side drive member 33 to hold and guide the drive member 33. A holder 85 is fastened to the chassis by a screw 86 to restrict the vertical play for the incoming side drive member 33.

The incoming side drive member 33 which has a small rotating angle is guided by the boss 83a of the holder 83 at all times and rotates on the holder 83.

Figure 20A:
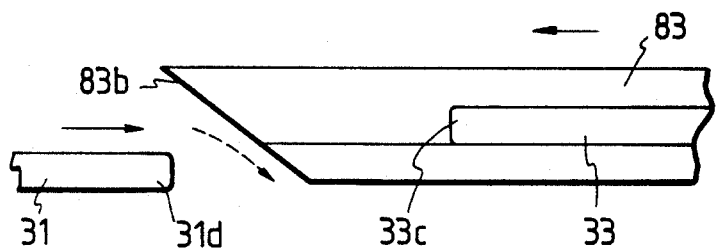
FIGS. 20(a)-20(b) are side views showing the operation of the guide base drive member and a holder.
Figure 20B:
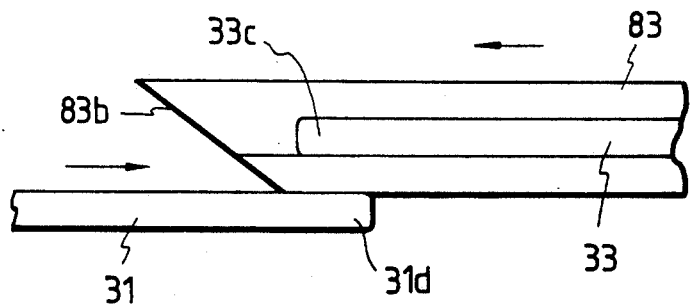

During the process between (b) and (c) of FIG. 17, there is a case where the holder 83 is not engaged with the end 31d of the outgoing side drive member 31. When the mechanism is unloaded and the holder 83 is engaged with the end 31d of the outgoing side drive member 31, the end 31d of the outgoing side drive member 31 can reliably be led beneath the holder 83 even when there is some deflection or warping on the end 31d as shown in FIG. 20 because the holder 83 has a tapered surface 83b for guiding. The ends 31d, 31e of the outgoing side drive member 31 that engage with the holder 83 are made larger in diameter than the gear portion 31a so that the gear portions 33a, 31a of the incoming and outgoing side drive members 33, 31 with the same diameter will not engage with the tapered surface 83b of the holder 83. The gap between the incoming and outgoing side drive members 33, 31 is restricted to the minimum to reduce the size of the apparatus. As shown in FIG. 2(a), when the loading operation is completed, the holder 83 is engaged with the end 31e of the outgoing side drive member 31 and receives the reaction of the guide base 27 produced when it is pressed against the catcher 28. This prevents the outgoing side drive member 31 from floating.

As explained above, this invention offers the following features:
(1) The assembly and work efficiency is greatly improved.
(2) The number of parts is significantly reduced.
(3) The required precision of parts is alleviated.
(4) The above features (1), (2) and (3) in turn realize a substantial cost reduction.

It should be noted that the above embodiment is just one example of this invention in all aspects and that this invention is not limited to the above embodiment alone and may be applied to other forms of embodiment without departing from the spirit and major features of the invention. The scope of this invention is defined by the appended claims. Any variations and changes presented in the claims are within the scope of this invention.

We claim:

1. A tape loading mechanism for at least one of a recording and a reproducing apparatus of a helical scan type in which signals are at least one of recorded on and reproduced from a tape by a head, said mechanism comprising:
   (a) a tape guide drum having a cylindrical outer surface including a tape guide surface, said tape guide drum having a rotating head mounted on a rotating member, and said rotating head being adapted to perform at least one of recording information on the tape and reproducing the recorded information from the tape;
   (b) a group of tape guides arranged close to an outer circumference of said tape guide drum, said group of tape guides being movable around said tape guide drum in order to extract the tape from a cassette and to wind the tape on said tape guide surface of said tape guide drum such that said rotating head can perform at least one of recording information on the tape and reproducing the recorded information from the tape, and said group of tape guides also being adapted to form a specified path along which the tape can travel;
   (c) a guide base which is reciprocally movable between a tape loading completion position and a tape unloaded position, said group of tape guides being mounted on said guide base;
   (d) a drive member engaged with said guide base for reciprocating said guide base around said tape guide drum, said drive member having a shaft embedded therein and said guide base being rotatably mounted on said shaft such that said guide base can rotate on said drive member around a longitudinal axis of said shaft; and
   (e) an attitude control member arranged along a path of travel of said guide base, said attitude control member being engaged with said guide base in order to prevent said guide base from rotating on said drive member around the longitudinal axis of said shaft beyond a specified angle value;
   wherein said attitude control member is in contact with two contact points of said guide base at one point along the path of travel of said guide base, said contact points being disposed at two spaced positions, one in front of and one behind said shaft embedded in said drive member.

2. A tape loading mechanism for at least one of a recording and a reproducing apparatus of a helical scan type in which signals are at least one of recorded on and reproduced from a tape by a head, said mechanism comprising:
   (a) a tape guide drum having a cylindrical outer surface including a tape guide surface, said tape guide drum having a rotating head mounted on a rotating member, and said rotating head being adapted to perform at least one of recording information on the tape and reproducing the recorded information from the tape;
   (b) a group of tape guides arranged close to an outer circumference of said tape guide drum, said group of tape guides being movable around said tape guide drum in order to extract the tape from a cassette and to wind the tape on said tape guide surface of said tape guide drum such that said rotating head can perform at least one of recording information on the tape and reproducing the recorded information from the tape, and said group of tape guides also being adapted to form a specified path along which the tape can travel;
   (c) a drive member comprising first and second arc drive members, said first and second arc drive members being arranged around said tape guide drum such that said first and second arc drive members are rotatable about a same fixed center in opposite directions in order to drive said group of tape guides, and said second arc drive member having a projection portion projecting beyond said first arc drive member; and (d) a holder engaged with said projection portion of said second arc drive member in order to restrict a vertical position of said second arc drive member;

wherein said holder is disposed within an arc locus of said first arc drive member and said second arc drive member, said holder has a tapered surface portion for separating said first and second arc drive members from each other, said tapered surface portion is positioned such that one end of ends of said first and second arc drive members, when said arc drive members are rotated in opposite directions, will engage with said tapered surface portion before the ends of said arc drive members cross each other, and said tapered surface portion has an element for restricting a vertical position of said first arc member.

* * * * *